L. D. TIBBETS.
POTATO DIGGING MACHINE.
APPLICATION FILED JUNE 1, 1914.

1,179,580. Patented Apr. 18, 1916.

Witneses.
Jefferson H Slagle
Herman M. Zapel

Inventor.
Lewis Dighton Tibbets

UNITED STATES PATENT OFFICE.

LEWIS DIGHTON TIBBETS, OF RICE, WASHINGTON.

POTATO-DIGGING MACHINE.

1,179,580. Specification of Letters Patent. Patented Apr. 18, 1916.

Application filed June 1, 1914. Serial No. 842,011.

*To all whom it may concern:*

Be it known that I, LEWIS DIGHTON TIBBETS, a citizen of the United States, residing at Rice, in the county of Stevens and State of Washington, have invented a new and useful Potato-Digging Machine, of which the following is a specification.

My invention relates to improvements in potato-digging machines of light draft and simple, economical construction, intended to be drawn by two horses, and lifting the potatoes and portion of soil and breaking same loose from the contiguous soil by means of a broad shovel, and separating the potatoes from the soil by means of a vibrating frame, or shaker and depositing them in rows behind the machine; and the objects of my improvement are: to effect by simple and inexpensive appliances a positive vibration of the shaker or frame upon which the potatoes are separated from the soil, and second, to deposit the potatoes in rows of narrow width instead of scattering them. I attain these objects by means of the mechanism illustrated in the accompanying drawing, in which—

Figure 1:
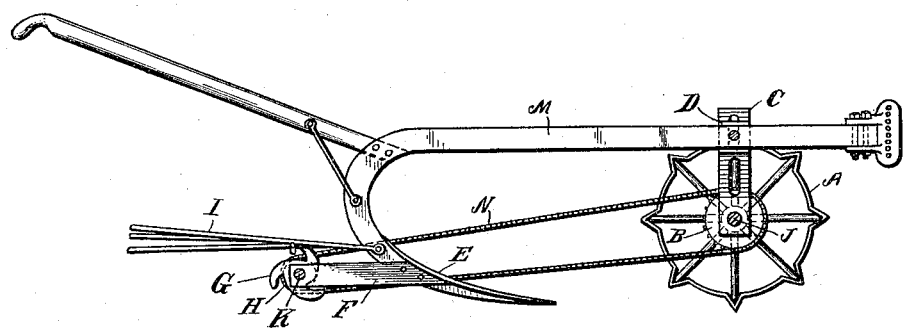
Figure 2:
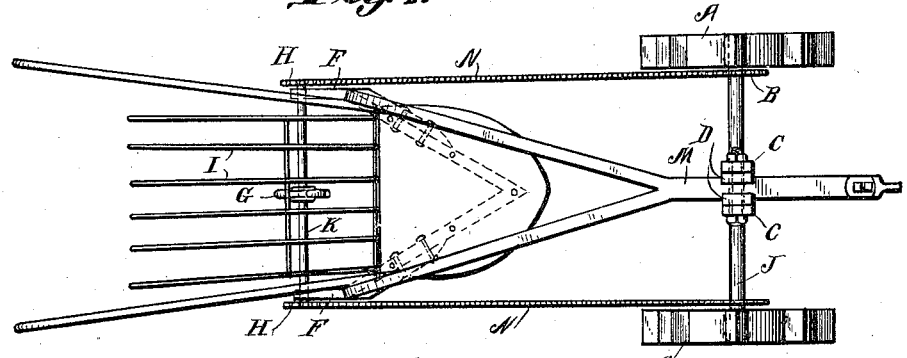
Figures 3, 4, 5:
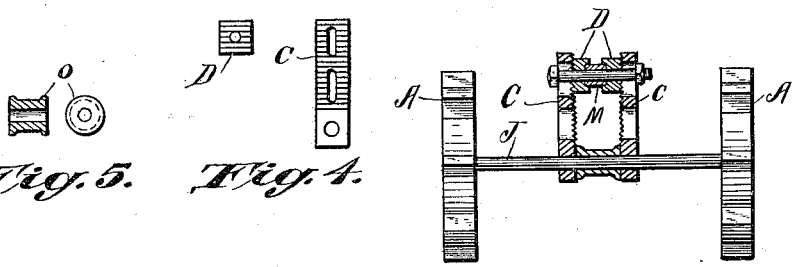

Figure 1 is a vertical section of the entire machine; Fig. 2, a top view of the machine; Fig. 3, vertical section through middle line of the shaft J, showing adjustable clamps and bearings CC and DD; Fig. 4, showing side view of clamp and bearing; and Fig. 5, showing sleeve for spreading clamps.

Similar letters refer to similar parts throughout the several views.

The beam M, to which the shovel E is bolted, the handles, the braces FF, and the clamps and bearings, CC and DD, constitute the frame-work of the machine. The two drive-wheels A, are identical in shape and construction, being cast with V-shaped lugs on their outer circumference to insure positive traction in soft ground. These wheels are keyed to the shaft J, which is free to rotate in the bearings near the lower ends of clamps CC. The clamps CC and DD have a sufficient range of adjustment up and down so that the front end of the beam M and the point of the shovel E may be tilted to regulate the depth of digging; collars are secured to the shaft J on the outer sides of the clamp-bearings CC to keep the bearings in proper position on the shaft J; a sprocket wheel B is keyed to the shaft J at each end just inside the drive-wheel A, these two sprockets communicate the driving power by means of the chains NN to the smaller sprockets HH which are keyed one to each end of the shaft K, which is supported by bearings in the braces FF; on the middle of the shaft K is keyed a cam wheel with several cams on its outer circumference, which in revolving, come in contact with the cross-bar constituting a part of the shaker, and give the shaker a positive up and down motion as each cam passes; the shaker, I, is hung upon a shaft at its front end, the rear end being free; the shaker consists of steel cross-bars and wood slats, the outer slats being elevated so as to make the upper surface of the shaker concave for the purpose of keeping the potatoes gathered toward the middle line of the shaker instead of spreading promiscuously, the front end of the shaker being practically flat, and the concavity increasing toward the rear end; the shovel has convex upper surface for about 10 inches from the point, thence gradually becomes concave on upper surface, with rising flanges at each side, so that potatoes and soil are guided toward the middle line of the shaker.

I am aware that prior to my invention potato-digging machines have been made with shovel and shaker to be drawn by animals or propelled by other motive force. I therefore do not claim such a combination broadly; but

I claim:

The combination in a potato-digging machine of a shovel with convex front upper part and concave rear upper part having gradually rising flanges on each side to guide potatoes to middle line of shaker, with a shaker gradually increasing in concavity of its upper surface from front end to rear end, all substantially as set forth.

LEWIS DIGHTON TIBBETS.

Witnesses:
HERMAN M. ZAPEL,
JEFFERSON H. SLAGLE.

Copies of this patent may be obtained for five cents each, by addressing the "Commissioner of Patents. Washington, D. C."